(12) United States Patent
Furukawa et al.

(10) Patent No.: US 9,007,724 B1
(45) Date of Patent: Apr. 14, 2015

(54) HEAD STRUCTURE WITH ELECTRIC DAMAGE PROTECTION FOR A MICROWAVE-ASSISTED HARD DISK DRIVE

(71) Applicant: HGST Netherlands B.V., Amsterdam (NL)

(72) Inventors: Masaru Furukawa, Kanagawa (JP); Junguo Xu, Kasumigaura (JP); Masato Shiimoto, Odawara (JP); Jianhua Li, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/302,549

(22) Filed: Jun. 12, 2014

(51) Int. Cl.
*G11B 5/33* (2006.01)
*G11B 5/48* (2006.01)
*G11B 21/02* (2006.01)

(52) U.S. Cl.
CPC ........................................ *G11B 5/48* (2013.01)

(58) Field of Classification Search
USPC .................................. 360/59, 75, 125.3, 128
See application file for complete search history.

(56) References Cited

U.S. PATENT DOCUMENTS

| | | | |
|---|---|---|---|
| 8,139,322 B2 | 3/2012 | Yamada et al. | |
| 8,154,825 B2 | 4/2012 | Takashita et al. | |
| 8,233,230 B2 | 7/2012 | Yano et al. | |
| 8,305,711 B2 | 11/2012 | Li et al. | |
| 8,345,380 B2 | 1/2013 | Sato et al. | |
| 8,570,684 B1 | 10/2013 | Contreras et al. | |
| 8,582,240 B1 * | 11/2013 | Chen et al. | 360/125.3 |
| 8,755,153 B2 * | 6/2014 | Kudo et al. | 360/321 |
| 8,797,693 B1 * | 8/2014 | Furukawa et al. | 360/323 |
| 2013/0229895 A1 | 9/2013 | Shiroishi et al. | |

OTHER PUBLICATIONS

Yoshida, K et al.; "Spin Torque Oscillator With Negative Magnetic Anisotropy Materials for MAMR"; IEEE Transactions on Magnetics; vol. 46, Issue 6; Jun. 2010.

* cited by examiner

*Primary Examiner* — Will J Klimowicz
(74) *Attorney, Agent, or Firm* — Patterson & Sheridan, LLP

(57) ABSTRACT

Embodiments disclosed herein generally relate to the data storage field and hard disk drives (HDD) using microwave assisted magnetic recording (MAMR) technology. Aspects of the preferred embodiments are to prevent the breakdown of spin torque oscillators (STO) due to large amounts of current flowing through the STO during head/disk contact. A magnetic head slider is disposed above and spaced apart from a disk. A STO is formed on a section of the magnetic head slider. Two electrodes are coupled to the STO, and one electrode has a higher potential than the other electrode. A preamplifier is adapted to send a current through the two electrodes, resulting in the higher potential electrode protruding closer to the disk than the lower potential electrode. Current then flows from one electrode to the disk without flowing through the STO, and breakdown of the STO is prevented.

20 Claims, 3 Drawing Sheets

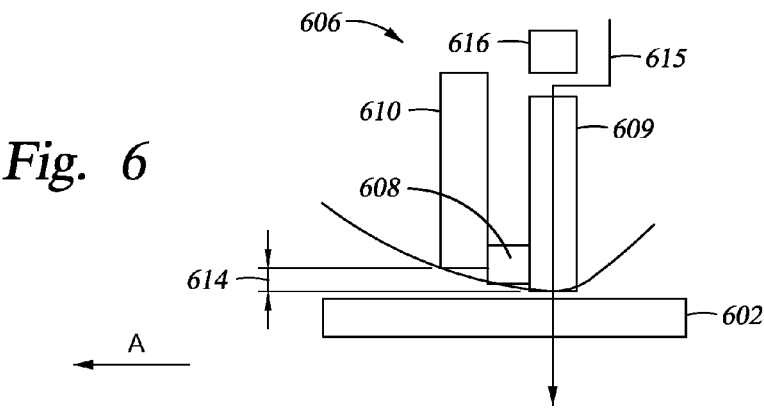
Fig. 6
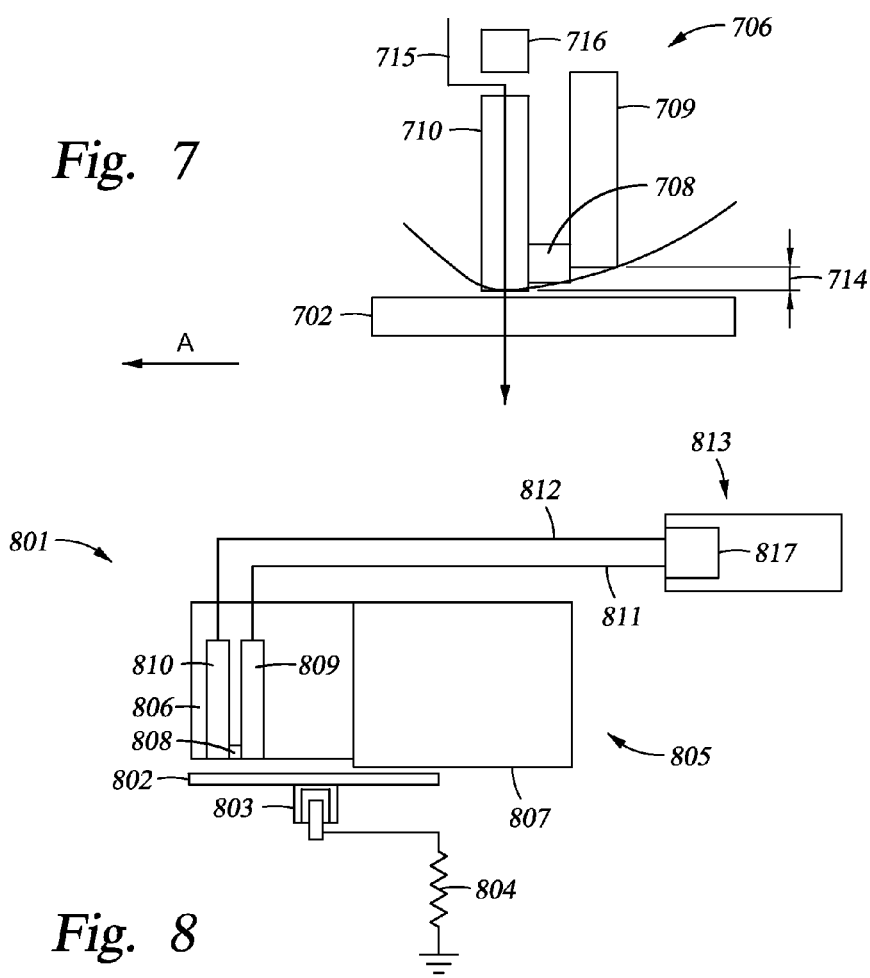
Fig. 7
Fig. 8

HEAD STRUCTURE WITH ELECTRIC DAMAGE PROTECTION FOR A MICROWAVE-ASSISTED HARD DISK DRIVE

BACKGROUND OF THE INVENTION

1. Field of the Invention

Embodiments disclosed herein generally relate to the data storage field, and more particularly, relate to a method, apparatus, and system for implementing enhanced electric damage prevention of spin-torque oscillator (STO) for hard disk drives (HDDs) using microwave assisted magnetic recording (MAMR) technology.

2. Description of the Related Art

In a HDD or a disk-drive system or magnetic recording system, read and write elements are located in a head slider of a magnetic head, which flies over a recording media or a disk surface. The fly-height of the slider-to-disk has become smaller as storage densities continue to increase. In recent years, MAMR technology has been developed in order to increase the recording density of a HDD. MAMR technology performs magnetic recording using a microwave assisted effect generated by a STO incorporated in the head slider.

The STO is connected to two electrodes in the head slider, which are a lower potential side electrode and a higher potential side electrode. Both electrodes are formed near the surface of the head slider, facing a disk. The STO is biased by a preamplifier (preamp), which is located in the HDD. The preamp controls the potential of the electrodes, and allows current to flow through the STO.

However, when the head slider contacts the disk or magnetic recording medium while current is flowing through the STO, breakdown of the STO can be caused. The breakdown of the STO is a large issue for HDD using MAMR technology. After repeated use, the breakdown process of the STO typically happens in the following manner: first, the lower potential side electrode, which is the lowest point of the head slider, contacts the disk. A large amount of current then flows from the higher potential side electrode, through the STO to the lower potential side electrode, and finally to the disk. The STO is broken by the large amount of current that consistently flows through the system.

Therefore, there is a need in the art for a MAMR head structure and a preamp circuit with electric damage protection to prevent breakdown of the STO.

SUMMARY OF THE INVENTION

Embodiments disclosed herein generally relate to the data storage field and HDDs using MAMR technology. Aspects of the preferred embodiments are to prevent the breakdown of STOs due to large amounts of current flowing through the spin torque oscillator during head/disk contact. A magnetic head slider is disposed above and spaced apart from a disk. A STO is formed on a section of the magnetic head slider. Two electrodes are coupled to the STO, and one electrode has a higher potential than the other electrode. A preamplifier is adapted to send a current through the two electrodes, resulting in the higher potential electrode protruding closer to the disk than the lower potential electrode. Current then flows from one electrode to the disk without flowing through the STO, and breakdown of the STO is prevented.

In one embodiment, a magnetic head slider comprises a thin film section formed on the magnetic head slider. An STO is formed on the thin film section, and a first STO electrode and a second spin STO electrode are both coupled to the STO, where the first STO electrode has a higher potential than the second STO electrode. A preamplifier is coupled to the first STO electrode and to the second STO electrode, and the preamplifier is adapted to send a current through the first STO electrode, resulting in the first STO electrode being closer to the surface of a magnetic media than both the second STO electrode and the STO.

In another embodiment, a HDD comprises a magnetic head slider, a disk disposed below the magnetic head slider and a disk spindle coupled to the disk, where the disk spindle is grounded through a resistance. A thin film section is formed on the magnetic head slider, and a STO is formed on the thin film section. A first STO electrode and a second STO electrode are both coupled to the STO, where the first STO electrode has a higher potential than the second STO electrode. A preamplifier is coupled to the first STO electrode and to the second STO electrode by two wires, and the preamplifier is adapted to send a current through the first STO electrode, resulting in the first STO electrode being closer to the disk than the second STO electrode.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 illustrates another embodiment of a thin film section of a head slider having a heater element facing a rotating disk.

FIG. 7 illustrates another embodiment of a thin film section of a head slider having a heater element facing a rotating disk.

FIG. 8 illustrates a HDD system including a limiter circuit.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to exemplified embodiments. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein generally relate to the data storage field and HDDs using MAMR technology. Aspects of the preferred embodiments are to prevent the breakdown of STOs due to large amounts of current flowing through the STO during head/disk contact. A magnetic head slider is disposed above and spaced apart from a disk. A STO is formed on a section of the magnetic head slider. Two electrodes are coupled to the STO, and one electrode has a higher potential than the other electrode. A preamplifier is adapted to send a current through the two electrodes, resulting in the higher potential electrode protruding closer to the disk than the lower potential electrode. Current then flows from the higher potential electrode to the disk without flowing through the STO, preventing breakdown of the STO.

Figure 1:
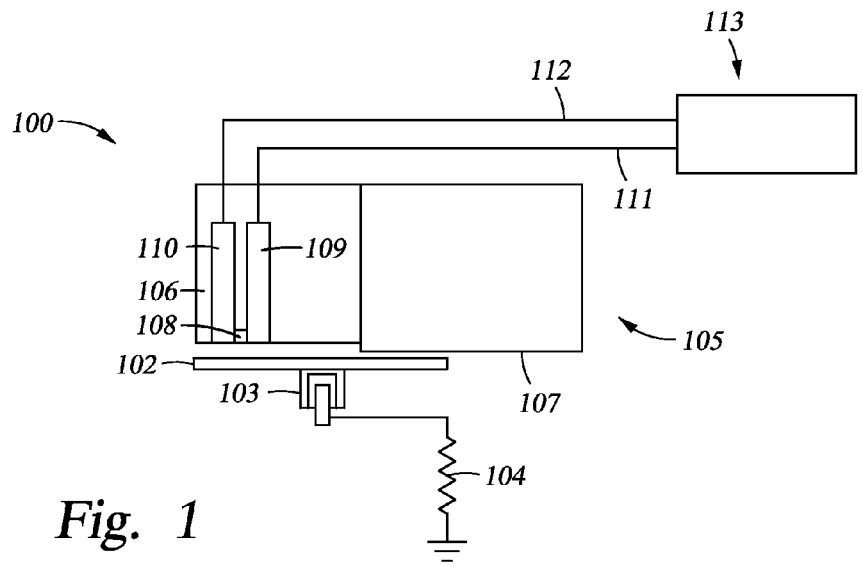
FIG. 1 illustrates a HDD system, according to one embodiment.

FIG. 1 shows a standard HDD system 100 used throughout the embodiments. The HDD 100 includes a recording media or a disk 102 for storing data, which is fixed to a disk spindle 103. The disk spindle 103 is grounded through a resistance 104. A head slider 105 having a slider main body 107 is levitated above the rotating disk 102. A thin film section 106 is formed on the end of the slider main body 107. A STO 108, a first STO electrode 109 and a second STO electrode 110 are formed on the thin film section 106. The first and second STO electrodes 109, 110 are connected to a preamp 113 through a pair of wirings 111 and 112. The first and second STO electrodes 109, 110 may be a leading shield and a trailing shield.

Current flows through the STO 108 due to a potential difference produced between the first STO electrode 109 and the second STO electrode 110 by the preamp 113. The direction of the current depends on the material of the STO 108, and both directions are considered. It should be noted that conduction could be in either a voltage-application configuration or in a current-application configuration. It is to be understood that while embodiments described herein are shown with reference to a HDD, the embodiments are applicable to other magnetic media as well such as tape drives and hybrid drives.

Figure 2:
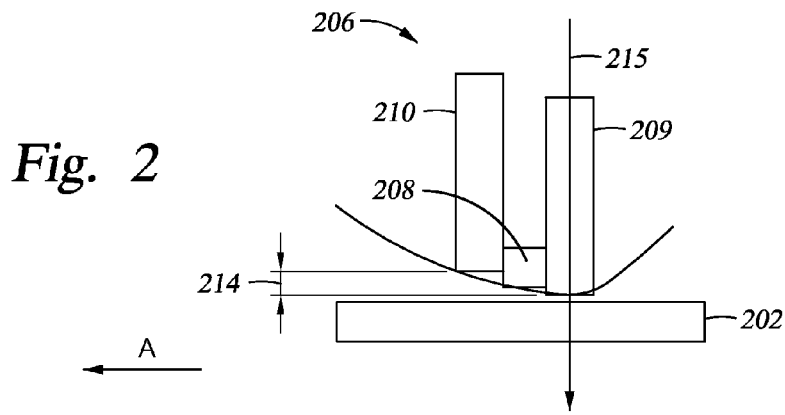
FIG. 2 illustrates one embodiment of a thin film section of a head slider facing a rotating disk.

FIG. 2 shows a schematic of a film section 206 facing a rotating disk 202, which is one embodiment for preventing STO breakdown due to electric damage. The disk 202 travels past the film section 206 in the direction of arrow "A". A STO 208, a first STO electrode 209 and a second STO electrode 210 are formed on the thin film section 206. The first STO electrode 209 is at the leading edge of the film section 206 while the second STO electrode 210 is at the trailing edge of the film section 206. The first STO electrode 209 protrudes beyond the second STO electrode 210 towards the surface of the rotating disk 202 such that the first STO electrode 209 is closer to the rotating disk 202 than the second STO electrode 210. In other words, in reference to the media facing surface (MFS), the MFS of the first STO electrode 209 is closer to the disk 202 than the MFS of the first STO electrode 209. The potential of the first STO electrode 209 becomes higher than that of the second STO electrode 210, and a current in the STO 208 flows from the first STO electrode 209 to the second STO electrode 210.

The first STO electrode 209 may extend closer to the disk 202 than the second STO electrode 210 due to a number of factors. One such factor is thermal expansion. The thermal expansion of the first STO electrode 209 towards the rotating disk 202 may be larger than that of the second STO electrode 210, and the potential of the first STO electrode 209 also becomes higher than that of the second STO electrode 210. The thermal expansion difference may be due to different material for the first and second STO electrodes 209, 210. In other words, the materials for the first and second STO electrodes 209, 210 may be different and may have different coefficients of thermal expansion. Another such factor is design of the electrodes. Specifically, the first STO electrode 209 may be designed to purposefully extend closer to the disk 202 than the second STO electrode 210.

Preferably, a vertical gap 214 (i.e., a gap perpendicular to the MFS) of at least 0.1 nm offsets the first STO electrode 209 and the second STO electrode 210, making the first STO electrode 209 closer to the surface of the disk 202 than the second STO electrode 210. The STO 208 is disposed between the first and the second STO electrodes 209, 210, and is further away from the surface of the disk 202 than the first STO electrode 209.

When the film section 206 contacts the rotating disk 202, the first STO electrode 209 is the first component to come into contact with the disk 202. A current 215 then flows from the first STO electrode 209 directly to the rotating disk 202, and does not flow through the STO 208. Therefore, breakdown of the STO is effectively prevented.

Figure 3:
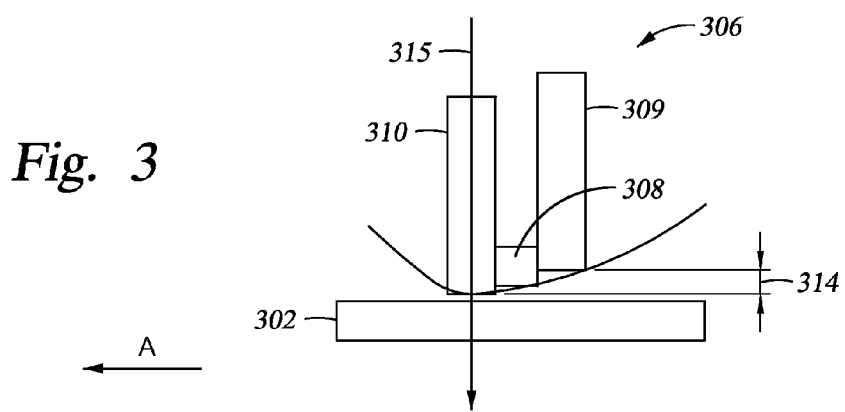
FIG. 3 illustrates another embodiment of a thin film section of a head slider facing a rotating disk.

FIG. 3 shows a schematic of a film section 306 facing a rotating disk 302, which is another embodiment for preventing STO breakdown due to electric damage. The disk 302 travels past the film section 306 in the direction of arrow "A". A STO 308, a first STO electrode 309 at the leading edge and a second STO electrode 310 at the trailing edge are formed on the thin film section 306. The second STO electrode 310 protrudes from the first STO electrode 309 towards the surface of the rotating disk 302. The potential of the second STO electrode 310 becomes higher than that of the first STO electrode 309, and a current in the STO 308 flows from the second STO electrode 310 to the first STO electrode 309.

Preferably, a gap 314 of at least 0.1 nm offsets the first STO electrode 309 and the second STO electrode 310, making the second STO electrode 310 closer to the surface of the disk 302 than the first STO electrode 309. The STO 308 is disposed between the first and the second STO electrodes 309, 310, and is further away from the surface of the disk 302 than the second STO electrode 310.

When the film section 306 contacts the rotating disk 302, the second STO electrode 310 is the first component to come into contact with the disk 302. A current 315 then flows from the second STO electrode 310 directly to the rotating disk 302, and does not flow through the STO 308. Therefore, breakdown of the STO is effectively prevented.

The second STO electrode 310 may extend closer to the disk 302 than the first STO electrode 309 due to a number of factors. One such factor is thermal expansion. The thermal expansion of the first STO electrode 309 towards the rotating disk 302 may be smaller than that of the second STO electrode 310, and the potential of the first STO electrode 309 also becomes lower than that of the second STO electrode 310. The thermal expansion difference may be due to different material for the first and second STO electrodes 309, 310. In other words, the materials for the first and second STO electrodes 309, 310 may be different and may have different coefficients of thermal expansion. Another such factor is design of the electrodes. Specifically, the first STO electrode 309 may be designed to purposefully extend further away from the disk 302 than the second STO electrode 310.

Figure 4:
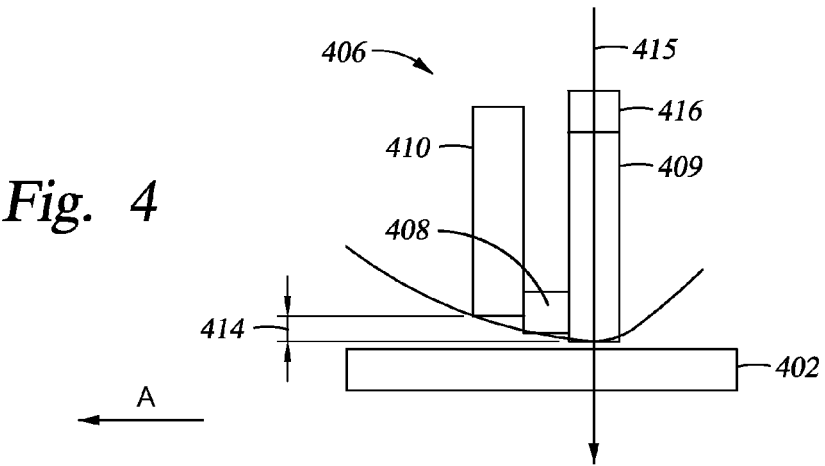
FIG. 4 illustrates one embodiment of a thin film section of a head slider having a heater element facing a rotating disk.

FIG. 4 shows a schematic of a film section 406 facing a rotating disk 402, which is another embodiment for preventing STO breakdown due to electric damage. A STO 408, a first STO electrode 409 at the leading edge, a second STO electrode 410 at the trailing edge and a heater element 416 are formed on the thin film section 406. The first STO electrode 409 and the heater element 416 are directly connected.

The potential of the first STO electrode 409 becomes higher than that of the second STO electrode 410, and a current in the STO 408 flows from the heater element 416, through the first STO electrode 409 to the second STO electrode 410. The heater element 416 expands due to self-heating, which biases the first STO electrode 409, causing the first STO electrode 409 to expand toward the rotating disk 402. Preferably, a gap 414 of at least 0.1 nm offsets the first STO electrode 409 and the second STO electrode 410, making the first STO electrode 409 closer to the surface of the disk 402 than the second STO electrode 410. The STO 408 is disposed between the first and the second STO electrodes 409, 410, and is further away from the surface of the disk 402 than the first STO electrode 409.

When the film section 406 contacts the rotating disk 402, the first STO electrode 409 is the first component to come into contact with the disk 402. A current 415 then flows from the first STO electrode 409 directly to the rotating disk 402, and does not flow through the STO 408. Therefore, breakdown of the STO is effectively prevented.

Figure 5:
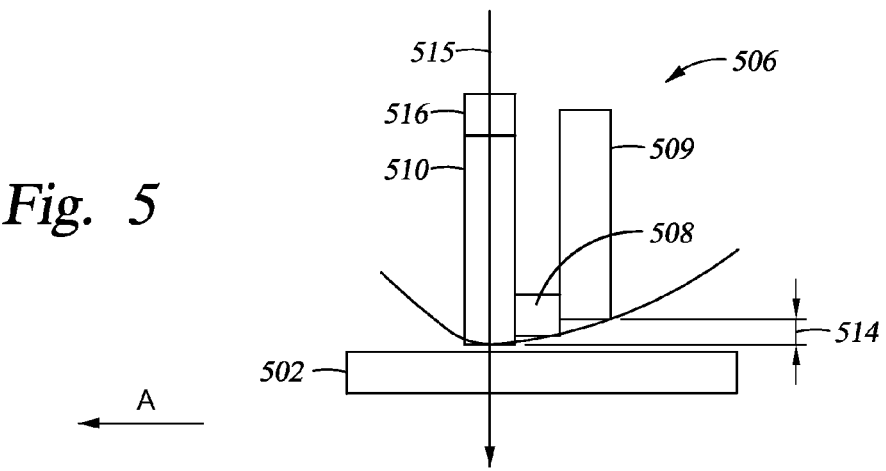
FIG. 5 illustrates another embodiment of a thin film section of a head slider having a heater element facing a rotating disk.

FIG. 5 shows a schematic of a film section 506 facing a rotating disk 502, which is another embodiment for preventing STO breakdown due to electric damage. A STO 508, a first STO electrode 509 at the leading edge, a second STO electrode 510 at the trailing edge and a heater element 516 are formed on the thin film section 506. The second STO electrode 510 and the heater element 516 are directly connected.

The potential of the second STO electrode 510 becomes higher than that of the first STO electrode 506, and a current in the STO 508 flows from the heater element 516, through the second STO electrode 510 to the first STO electrode 509. The heater element 516 expands due to self-heating, which biases the second STO electrode 510, causing the second STO electrode 510 to expand toward the rotating disk 502. Preferably, a gap 514 of at least 0.1 nm offsets the first STO electrode 509 and the second STO electrode 510, making the second STO electrode 510 closer to the surface of the disk 502 than the first STO electrode 509. The STO 508 is disposed between the first and the second STO electrodes 509, 510, and is further away from the surface of the disk 502 than the second STO electrode 510.

When the film section 506 contacts the rotating disk 502, the second STO electrode 510 is the first component to come into contact with the disk 502. A current 515 then flows from the second STO electrode 510 directly to the rotating disk 502, and does not flow through the STO 508. Therefore, breakdown of the STO is effectively prevented.

FIG. 6 shows a schematic of a film section 606 facing a rotating disk 602, which is another embodiment for preventing STO breakdown due to electric damage. A STO 608, a first STO electrode 609 at the leading edge, a second STO electrode 610 and a heater element 616 are formed on the thin film section 606. The heater element 616 is disposed directly above and spaced apart from the first STO electrode 609 and is independently connected to the preamp (not shown).

The potential of the first STO electrode 609 becomes higher than that of the second STO electrode 610. A current in the STO 608 flows from the first STO electrode 609 to the second STO electrode 610. The heater element 616 is biased by the preamp and expands due to self-heating, which causes the first STO electrode 609 to expand toward the rotating disk 602. Preferably, a gap 614 of at least 0.1 nm offsets the first STO electrode 609 and the second STO electrode 610, making the first STO electrode 609 closer to the surface of the disk 602 than the second STO electrode 610. The STO 608 is disposed between the first and the second STO electrodes 609, 610, and is further away from the surface of the disk 602 than the first STO electrode 609.

When the film section 606 contacts the rotating disk 602, the first STO electrode 609 is the first component to come into contact with the disk 602. A current 615 then flows from the first STO electrode 609 directly to the rotating disk 602, and does not flow through the STO 608. Therefore, breakdown of the STO is effectively prevented.

FIG. 7 shows a schematic of a film section 706 facing a rotating disk 702, which is another embodiment for preventing STO breakdown due to electric damage. A STO 708, a first STO electrode 709 at the leading edge, a second STO electrode 710 at the trailing edge and a heater element 716 are formed on the thin film section 706. The heater element 716 is disposed directly above and spaced apart from the second STO electrode 710 and is independently connected to the preamp (not shown).

The potential of the second STO electrode 710 becomes higher than that of the first STO electrode 709. A current in the STO 708 flows from the second STO electrode 710 to the first STO electrode 709. The heater element 716 is biased by the preamp and expands due to self-heating, which causes the second STO electrode 710 to expand toward to the rotating disk 702. Preferably, a gap 714 of at least 0.1 nm offsets the first STO electrode 709 and the second STO electrode 710, making the second STO electrode 710 closer to the surface of the disk 702 than the first STO electrode 709. The STO 708 is disposed between the first and the second STO electrodes 709, 710, and is further away from the surface of the disk 702 than the second STO electrode 710.

When the film section 706 contacts the rotating disk 702, the second STO electrode 710 is the first component to come into contact with the disk 702. A current 715 then flows from the second STO electrode 710 directly to the rotating disk 702, and does not flow through the STO 708. Therefore, breakdown of the STO is effectively prevented.

FIG. 8 shows a schematic of a HDD 801, which is another embodiment for preventing STO breakdown due to electric damage. The HDD 801 includes a recording media or a disk 802 for storing data, which is coupled to a disk spindle 803. The disk spindle 803 is grounded by a resistance 804. A head slider 805 having a slider main body 807 is levitated above the rotating disk 802. A thin film section 806 is formed on the end of the slider main body 807. A STO 808, a first STO electrode 809 and a second STO electrode 810 are formed on the thin film section 806. The first STO electrode 809 and the second STO electrode 810 are connected to a preamp 813 through a pair of wirings 811 and 812. The first and second STO electrodes 809, 810 may be a leading shield and a trailing shield. The thin film section 806, the STO 808, the first STO electrode 809 and the second STO electrode 810 may be any of the other previous embodiments as discussed above.

The preamp 813 is coupled to a limiter circuit 817, which limits the amount of current applied to the STO 808. The preamp 813 includes a programmable register to pre-set a limit value on the limiter circuit 817 and to set an alert limit value.

When the film section 806 contacts the surface of the rotating disk 802, a current flows from either the first STO electrode 809 to the rotating disk 802, or from the second STO electrode 810 to the rotating disk 802, depending on other conditions of the HDD system 801 and the components of the thin film section 806, as discussed in previous embodiments above. If the film section 806 continues to contact the surface of the rotating disk 802, either the first STO electrode 809 or the second STO electrode 810 is worn. The STO 808 directly contacts the rotating disk 802 and will be broken by the current flowing from the STO 808 to the rotating disk 802. In one embodiment, if the current exceeds the limit value, the limiter circuit 817 stops the current before the large amount of current can flow through the STO 808 and sets the alert limit value. Therefore, breakdown of the STO is effectively prevented.

Preferably, the limit value of the current is adapted to change in regard to the preferred amount of current to the STO 808, which differs in regard to temperature changes of the STO 808. For example, self-heating of the STO 808, heating from a writer in the thin film section 806, heating from a thermal fly height control heater in the thin film section 806 and heating or cooling from the environment temperature around the HDD 801 all vary the temperature of the STO 808. In other words, the limit value of the current is a function of temperature.

Aspects of the preferred embodiments are to provide a method, apparatus, and system for electric damage protection to prevent the breakdown of a STO due to large amounts of current through the STO during head/disk contact for use in HDDs using MAMR technology.

While the foregoing is directed to embodiments of the present invention, other and further embodiments of the invention may be devised without departing from the basic scope thereof, and the scope thereof is determined by the claims that follow.

What is claimed is:

1. A magnetic head slider, comprising;
   a spin torque oscillator;
   a first spin torque oscillator electrode coupled to the spin torque oscillator;
   a second spin torque oscillator electrode coupled to the spin torque oscillator such that the spin torque oscillator is disposed between the first spin torque oscillator electrode and the second spin torque oscillator electrode, and wherein the first spin torque oscillator electrode has a higher potential than the second spin torque oscillator electrode; and
   a preamplifier coupled to the first spin torque oscillator electrode and the second spin torque oscillator electrode, wherein the preamplifier is adapted to send a current through the first spin torque oscillator electrode, and wherein the first spin torque oscillator electrode is positioned closer to a surface of a disk than both the second spin torque oscillator electrode and the spin torque oscillator.

2. The magnetic head slider of claim 1, wherein a media facing surface of the first spin torque oscillator electrode is at least 0.1 nanometers closer to the surface of the disk than a media facing surface of the second spin torque oscillator electrode.

3. The magnetic head slider of claim 2, wherein the spin torque oscillator is further away from the surface of the disk than the media facing surface of the first spin torque oscillator electrode.

4. The magnetic head slider of claim 1, wherein the first spin torque oscillator electrode has a larger thermal expansion coefficient than the second spin torque oscillator electrode.

5. The magnetic head slider of claim 1, further comprising a heater element coupled to the first spin torque oscillator electrode.

6. The magnetic head slider of claim 1, wherein the first spin torque oscillator electrode is disposed at a leading edge.

7. The magnetic head slider of claim 1, further comprising a heater element disposed above and spaced apart from the first spin torque oscillator electrode.

8. The magnetic head slider of claim 7, wherein the heater element is biased by the preamplifier.

9. The magnetic head slider of claim 1, wherein a limiter circuit is coupled to the preamplifier.

10. The magnetic head slider of claim 1, wherein the first spin torque oscillator electrode is disposed at a trailing edge.

11. A hard disk drive, comprising:
    a magnetic head slider;
    a disk disposed below the magnetic head slider;
    a disk spindle coupled to the disk, wherein the disk spindle is grounded through a resistance;
    a spin torque oscillator coupled to the slider;
    a first spin torque oscillator electrode coupled to the spin torque oscillator;
    a second spin torque oscillator electrode coupled to the spin torque oscillator, wherein the spin torque oscillator is disposed between the first spin torque oscillator electrode and the second spin torque oscillator electrode, wherein the first spin torque oscillator electrode has a higher potential than the second spin torque oscillator electrode; and
    a preamplifier coupled to the first spin torque oscillator electrode and the second spin torque oscillator electrode, wherein the preamplifier is adapted to send a current through the first spin torque oscillator electrode, and wherein the first spin torque oscillator electrode is closer to the disk than the second spin torque oscillator electrode.

12. The hard disk drive of claim 11, wherein a media facing surface of the first spin torque oscillator electrode is at least 0.1 nanometers closer to the surface of the disk than a media facing surface of the second spin torque oscillator electrode.

13. The hard disk drive of claim 12, wherein the spin torque oscillator is further away from the surface of the disk than the media facing surface of the first spin torque oscillator electrode.

14. The hard disk drive of claim 11, wherein the first spin torque oscillator electrode has a larger thermal expansion coefficient than the second spin torque oscillator electrode.

15. The hard disk drive of claim 11, further comprising a heater element coupled to the top of the first spin torque oscillator electrode.

16. The hard disk drive of claim 11, wherein the first spin torque oscillator electrode is disposed at a leading edge.

17. The hard disk drive of claim 11, further comprising a heater element is disposed above and spaced apart from the first spin torque oscillator electrode.

18. The hard disk drive of claim 17, wherein the heater element is biased by the preamplifier.

19. The hard disk drive of claim 11, wherein a limiter circuit is coupled to the preamplifier.

20. The hard disk drive of claim 11, wherein the first spin torque oscillator electrode is disposed at a trailing edge.

* * * * *

UNITED STATES PATENT AND TRADEMARK OFFICE
CERTIFICATE OF CORRECTION

| | | |
|---|---|---|
| PATENT NO. | : 9,007,724 B1 | Page 1 of 1 |
| APPLICATION NO. | : 14/302549 | |
| DATED | : April 14, 2015 | |
| INVENTOR(S) | : Furukawa et al. | |

It is certified that error appears in the above-identified patent and that said Letters Patent is hereby corrected as shown below:

In the Claims:

Column 8, Claim 17, Line 53, delete "is".

Signed and Sealed this
Twenty-ninth Day of December, 2015

Michelle K. Lee
*Director of the United States Patent and Trademark Office*